United States Patent [19]
Fujisaki et al.

[11] 3,945,103
[45] Mar. 23, 1976

[54] APPARATUS FOR ASSEMBLING SLIDERS WITH FASTENER STRINGERS

[75] Inventors: Yoshinori Fujisaki; Shunichi Shigeno, both of Kurobe, Japan

[73] Assignee: Yoshida Kogyo Kabushiki Kaisha, Japan

[22] Filed: Dec. 27, 1974

[21] Appl. No.: 536,997

[30] Foreign Application Priority Data
Dec. 28, 1973 Japan.................................. 49-1402

[52] U.S. Cl. ............................ 29/207.5 SL; 29/408
[51] Int. Cl.² ...................... B21D 53/50; B29D 5/00
[58] Field of Search ....... 29/207.5 R, 207.5 SL, 408

[56] References Cited
UNITED STATES PATENTS

| | | | |
|---|---|---|---|
| 2,879,588 | 3/1959 | Morin............................ | 29/207.5 SL |
| 3,600,786 | 8/1971 | Hansen......................... | 29/207.5 SL |
| 3,663,000 | 5/1972 | Perlman ....................... | 29/207.5 SL |

Primary Examiner—Victor A. DiPalma
Attorney, Agent, or Firm—Bucknam and Archer

[57] ABSTRACT

Fastener assembly apparatus including a slider holder for holding a slider in upside-down disposition for the assemblage of a fastener chain in the form of a continuous length of coupled stringers. A stringer separator is mounted on the stringer exit side of the slider holder to permit the fastener stringers to be separated away from each other in a streamlined fashion as they emerge uncoupled out of the flared front end of the channeled slider body on the slider holder. In case a pair of oppositely directed sliders are to be assembled with each fastener length of the chain, a stringer guide is additionally mounted on the stringer entrance side of the slider holder to cause the fastener stringers to be introduced uncoupled into one of the sliders on the slider holder through its flared front end in a streamlined fashion.

6 Claims, 11 Drawing Figures

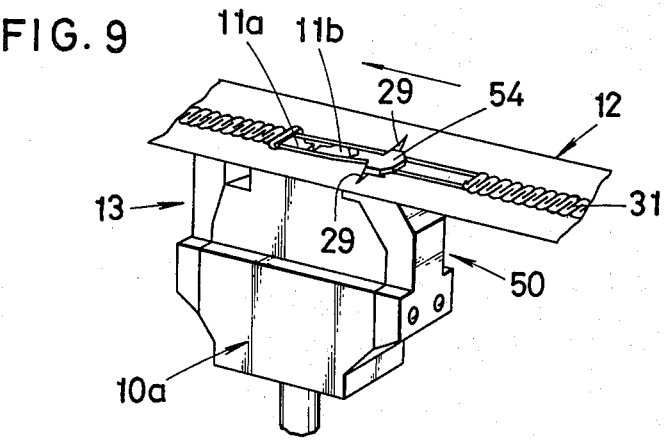
FIG. 9
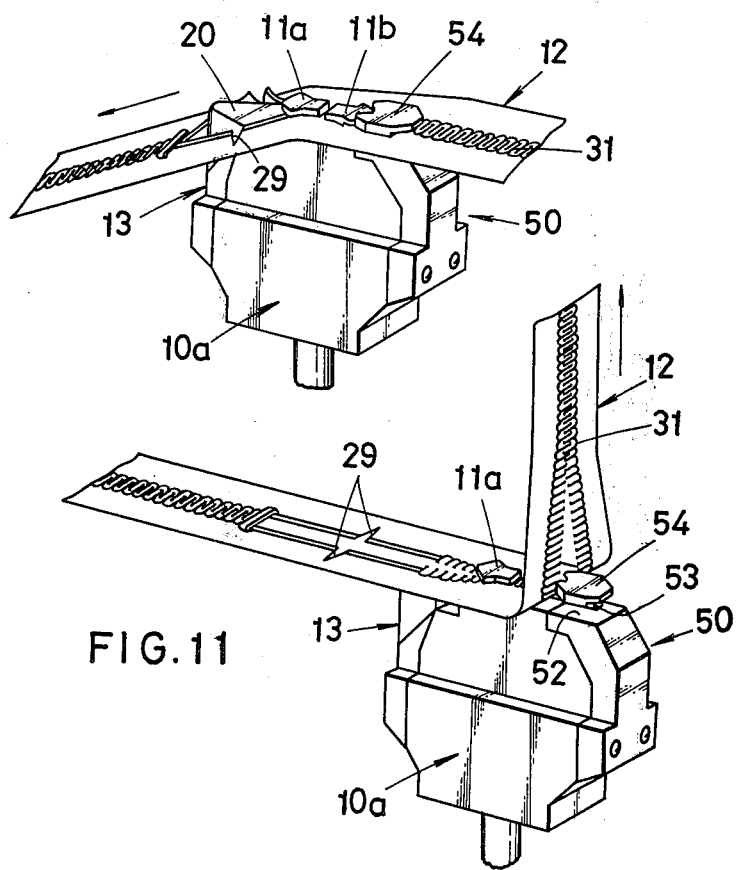
FIG. 10
FIG. 11

APPARATUS FOR ASSEMBLING SLIDERS WITH FASTENER STRINGERS

BACKGROUND OF THE INVENTION

This invention relates generally to the art of slide fastener manufacture, and more specifically to apparatus for use in assembling sliders with fastener stringers or a fastener chain, by which latter term is meant a continuous length of coupled fastener stringers.

The assemblage of sliders with fastener stringers has heretofore been effected by use of a slider holder which, as the name implies, functions merely to hold a slider in upside-down disposition on a slider rest formed thereon, with the pull tab of the slider telescopically received in a channel extending downwardly from the slider rest. The pair of fastener stringers are manipulated into the channeled slider body, either through its flared front end or contracted rear end, so as to emerge either coupled or uncoupled out of the opposite end of the slider body.

Since the slider holder is effective only to hold the slider in a predetermined assembly position thereon as aforesaid, the smooth guidance of the fastener stringers into and out of the slider depends solely on the manual dexterity of the assemblyman. Above all, for attaching sliders to the respective fastener lengths of a fastener chain on which bottom stops have been mounted (see FIG. 2 of the accompanying drawings), the coupled stringers of the fastener chain must be carefully threaded into and out of the successive sliders by utilizing the narrow, longitudinal tape spacings between the rows of interlocking fastener elements. In case a pair of oppositely directed sliders are to be assembled with each fastener length of the fastener chain (FIG. 7), the threading of the chain through the sliders requires an even higher degree of manual skill and mental concentration on the part of the assemblyman.

Thus, as will be evident from the above noted state of the art, the difficulties involved in assembling sliders with a fastener chain or stringers have been a serious bar to the truly efficient manufacture of slide fasteners.

SUMMARY OF THE INVENTION

It is, therefore, a principal object of this invention to provide apparatus which permits the easy assemblage of sliders with a fastener chain or stringers even by semi- or non-skilled labor, whereby the production of slide fasteners is materially simplified and speeded up.

Another object of the invention is to provide fastener assembly apparatus which is readily adaptable both for the production of a slide fastener having a single slider on a pair of stringers and of one having a pair of oppositely directed sliders on a pair of stringers.

A further object of the invention is to provide fastener assembly apparatus of extremely simple, inexpensive and compact construction.

According to one preferable form of the fastener assembly apparatus hereinafter disclosed, a slider holder is provided which immovably holds a slider thereon to permit a fastener chain or stringers to be introduced in coupled form into the slider through the contracted rear end of its channeled body. A stringer separator is arranged close to the slider holder, on the stringer exit side thereof, to permit the fastener stringers to be separated away from each other in a streamlined fashion as they emerge uncoupled out of the flared front end of the slider body.

In event a pair of oppositely directed sliders are to be assembled with each fastener length of the fastener chain, the slider holder is so modified as to immovably hold the pair of sliders thereon with their contracted rear ends disposed against each other. In addition to the stringer separator arranged on the stringer exit side of the slider holder, there is provided a stringer guide which is arranged close to the slider holder, on the stringer entrance side thereof, to permit the fastener stringers to be introduced uncoupled into one of the sliders through its flared front end in a streamlined fashion. The stringers emerging uncoupled out of the flared front end of the other slider are likewise separated away from each other by the stringer separator.

The fastener assembly apparatus of this invention, briefly summarized in the foregoing, is based upon the fact that the smooth guidance of fastener stringers into and out of a slider or sliders is essential for their efficient assemblage. Since the fastener stringers are caused to travel along predetermined streamlined paths as they are threaded into and out of the slider or sliders by use of the fastener assembly apparatus of the invention, the noted difficulties of the prior art are overcome altogether.

The features which are believed to be novel and characteristic of this invention are set forth in particular in the claims appended hereto. The invention itself, however, both as to its organization and manner of functioning, together with the further objects and advantages thereof, will become apparent in the course of the following description of preferred embodiments when read in connection with the accompanying drawings in which like reference characters denote corresponding parts of the several views.

BRIEF DESCRIPTION OF THE DRAWINGS

FIGS. 9 and 10 are perspective views also explanatory of the way the fastener chain is assembled through the pair of sliders by use of the apparatus shown in FIG. 6; and FIG. 11 is a perspective view explanatory of the way the fastener chain is withdrawn from the apparatus shown in FIG. 6 following its assemblage through the pair of sliders.

DESCRIPTION OF THE PREFERRED EMBODIMENTS

Figure 1:
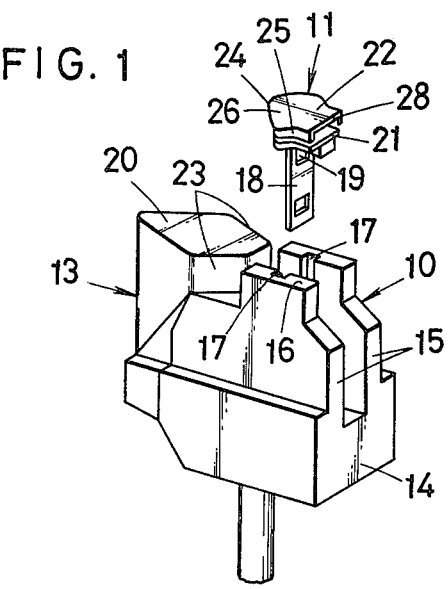
FIG. 1 is a perspective view of fastener assembly apparatus constructed in accordance with the novel concepts of this invention.

The invention will now be described in terms of one specific adaptation thereof with reference to FIGS. 1 through 5. The fastener assembly apparatus illustrated in FIG. 1 is adapted for assembling sliders with a fastener chain to the form illustrated in FIG. 2, that is, for attaching one slider to each fastener length of the chain. The fastener chain is supplied in the form of a continuous length of coupled stringers to which bottom stops have been attached.

Referring more specifically to FIG. 1, the illustrated fastener assembly apparatus broadly comprises a slider holder 10 for holding a slider 11 for the assemblage of the fastener chain 12 therethrough, and a stringer separator 13 for separating the pair of stringers of the fastener chain away from each other after they have been guided through the slider.

The slider holder for use in the fastener assembly apparatus of this invention can be of any suitable construction known in the art. The illustrated slider holder 10, for example, includes a frame 14 having a pair of opposed side walls 15. The tops of these walls 15 are adapted to provide in combination a slider rest 16, and a pair of vertical grooves 17 are formed in the respective internal surfaces of the side walls to provide a channel for receiving the pull tab 18 of the slider 11 as the same is placed upside down on the slider rest. Mounted within the frame 14 is a slider locking mechanism, not shown, which operates to immovably lock the slider on the slider rest 16 as by means of a detent projecting into the aperture 19 in the slider pull tab 18. Following the assemblage of each fastener length of the fastener chain 12 through the slider 11, the unshown slider locking mechanism can be caused to unlock the slider in order that the latter may be readily withdrawable from the slider rest 16 together with the attached stringers.

The stringer separator 13 is in the form of a column of substantially pentagonal or diamond-shaped cross section fixedly mounted close to, and on the stringer exit side of, the slider holder 10. It will be noted, by referring also to FIGS. 3 and 4, that the cross section of the pentagonal column constituting the stringer separator 13 is symmetrical with respect to its longitudinal axis which is aligned with the longitudinal axis of the slider 11 mounted in position on the slider rest 16 of the slider holder 10. The top surface 20 of the pentagonal column should be on a level with, or higher than, the internal surface of the top wing 21 of the channeled slider body 22 mounted in position on the slider rest 16.

Figure 3:
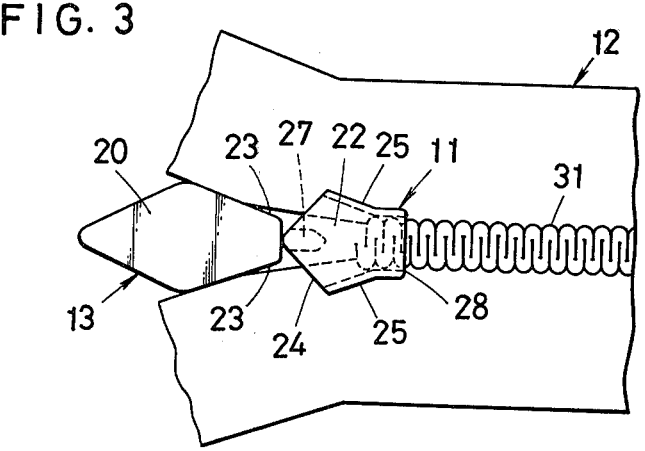
FIGS. 3 and 4 are plan views explanatory of the way the fastener chain is assembled through the slider by use of the apparatus shown in FIG. 1.
Figure 4:
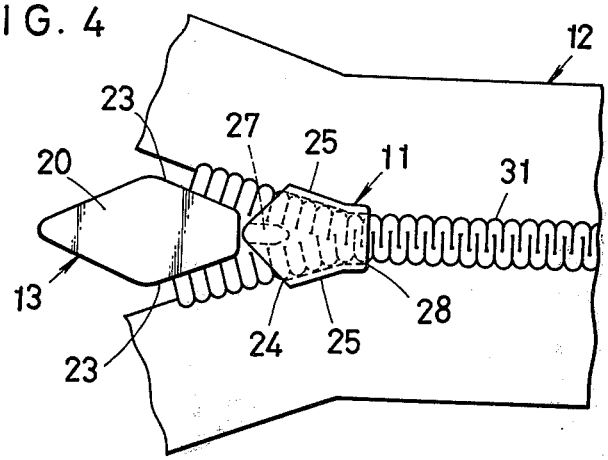
Figure 5:
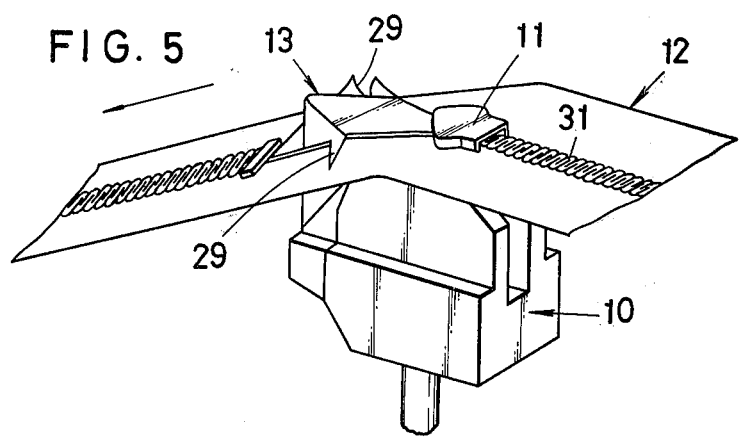
FIG. 5 is a perspective view also explanatory of the way the fastener chain is assembled through the slider by use of the apparatus shown in FIG. 1.

It is important to note that the pentagonal column of the stringer separator 13 includes a pair of vertical stringer separating surfaces 23 which, when viewed in a plan view as shown in FIGS. 3 or 4, diverge in a direction away from the slider holder 10. The angle between these divergent stringer separating surfaces 23 should be so determined as to permit the pair of stringers of the fastener chain 12 to separate away from each other in the most streamlined fashion as they emerge uncoupled from the flared front end 24 of the channeled slider body 22 on the slider rest 16. Stated in more concrete terms, the angle between the stringer separating surfaces 23 should be equal to, or slightly greater than, the angle between the divergent portions of the side flanges 25 of the slider body 22 bounding the usual Y-shaped guide channel therethrough.

It will have been understood from the foregoing description that the slider 11 for use with the fastener assembly apparatus of this invention can be of the well known type comprising the apertured pull tab 18 and the channeled body 22, the pull tab being pivotally or hingedly connected to the body. The slider body 22 comprises the top wing 21 and a bottom wing 26, with the side flanges 25, which wings are interconnected by a web or neck 27 so as to define the Y-shaped guide channel through the slider body. The top and bottom wings 21 and 26 are so shaped as to provide the flared front end 24 and a contracted rear end 28, and the aforesaid web 27 is located centrally at the flared front end 24 of the slider body 22.

Figure 2:
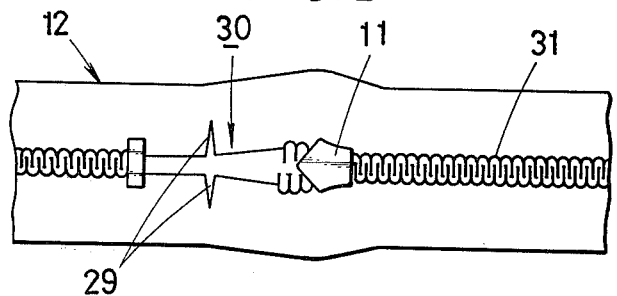
FIG. 2 is a plan view of a fastener chain with a slider attached thereto by use of the apparatus shown in FIG. 1.

For assembling the slider 11 with the fastener chain 12 as shown in FIG. 2 by use of the above described fastener assembly apparatus according to the invention, the slider should first be mounted on the slider rest 16 of the slider holder 10 by having its pull tab 18 inserted fully into the channel formed by the pair of grooves 17, with the flared front end 24 of the slider body 22 directed toward the stringer separator 13. As the unshown slider locking mechanism of the slider holder 10 functions to engage the aperture 19 in the pull tab 18, the slider 11 can be immovably supported on the slider rest 16 in upside-down disposition.

The adjacent longitudinal edge portions of the coupled stringers of the fastener chain 12 should then be manipulated into the contracted rear end 28 of the slider body 22. This manipulation of the stringers into the slider body may be started from a pair of slits 29, FIG. 2, formed in the free tape spacing 30 of the fastener chain. As the interengaged elements 31 of the fastener chain 12 are succeedingly guided into the slider body 22 as shown in FIG. 3, the fastener chain may be pulled as indicated by the arrow in FIG. 5 so that the fastener elements 31 successively emerge disengaged from the flared front end 24 of the slider body as shown in FIG. 4.

It will be observed from a consideration of FIGS. 3 and 4 that the stringers which have passed the slider 11 are smoothly separated away from each other as their opposed longitudinal edges move in sliding contact with the respective stringer separating surfaces 23 of the separator 13. Since, in this manner, the rows of fastener elements 31 are disengaged from each other just as they enter the contracted rear end 28 of the slider body 22, as illustrated in FIG. 3, the leading end of the fastener elements is not to be caught by the web 27 of the slider body to impede the travel of the fastener chain through the slider. The fastener chain can therefore be efficiently assembled through the slider.

When the fastener chain 12 is pulled through the slider 11 to a required degree, the slider locking mechanism of the slider holder 10 may be actuated to unlock the slider. The pull tab 18 of the slider may now be pulled out of the slider holder channel to withdraw the slider from the slider rest 16 together with the attached fastener chain.

Figure 7:
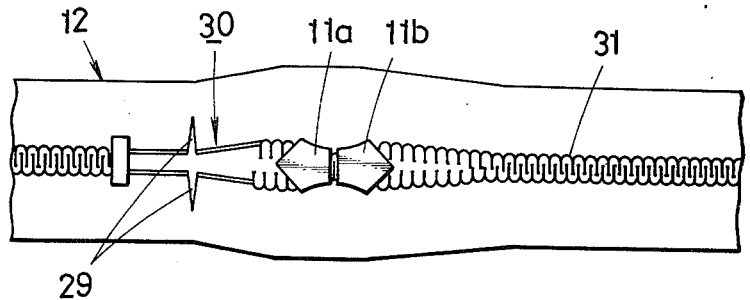
FIG. 7 is a plan view of a fastener chain with a pair of oppositely directed sliders attached to each fastener length thereof by use of the apparatus shown in FIG. 6.
Figure 6:
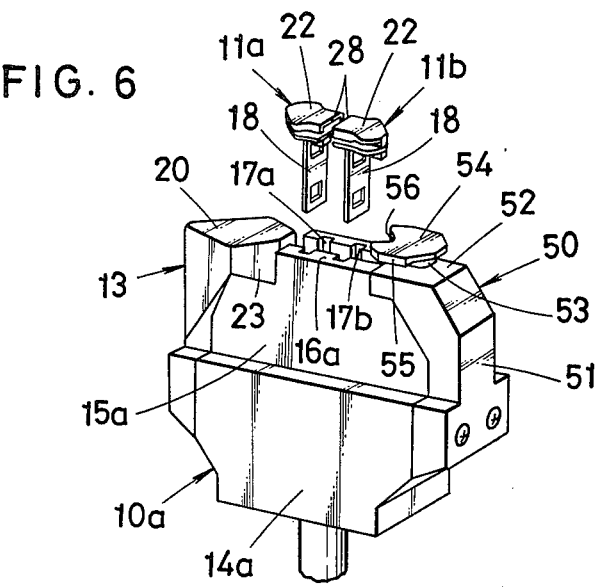
FIG. 6 is a perspective view of fastener assembly apparatus representing another specific adaptation of the invention.

FIG. 6 illustrates another specific adaptation of the invention, in which the fastener assembly apparatus is intended for use where a pair of oppositely directed sliders 11a and 11b are to be assembled with each fastener length of the fastener chain 12 as illustrated in FIG. 7. The sliders 11a and 11b are identical in construction with the slider 11 explained above in connection with the preceding embodiment of the invention.

The fastener assembly apparatus illustrated in FIG. 6 broadly comprises a slider holder 10a, the stringer separator 13 fixedly mounted close to the slider holder on the fastener chain exit side thereof, and a stringer guide 50 also fixedly mounted close to the slider holder on the stringer entrance side thereof. The stringer separator 13 can be exactly identical in construction with that shown in FIG. 1, so that no explanation will now be given thereon.

The slider holder 10a used in this second adaptation of the invention differs slightly from the above described slider holder 10, in that the side walls 15a of the former have two pairs of vertical grooves 17a and 17b in their opposed internal surfaces. The two channels thus formed by the grooves 17a and 17b are adapted to receive the respective pull tabs 18 of the sliders 11a and 11b, in such a manner that the two sliders are mounted upside down on a slider rest 16a on the top of a holder frame 14a with their contracted rear ends 28 disposed against each other. Although not shown in the drawing, it is assumed that the usual slider locking mechanism is provided within the holder frame 14a to immovably lock the sliders 11a and 11b on the slider rest 16a.

The stringer guide 50 newly incorporated in this fastener assembly apparatus includes a support structure 51 substantially integrally joined to the holder frame 14a and having a horizontal top surface 52 arranged flush with the top of the holder frame. A guide column 53 of substantially diamond-shaped cross section is fixedly mounted at the center of the top surface 52 of the support structure 51, and a guide plate 54 is further secured at the top of the guide column 53.

Figure 8:
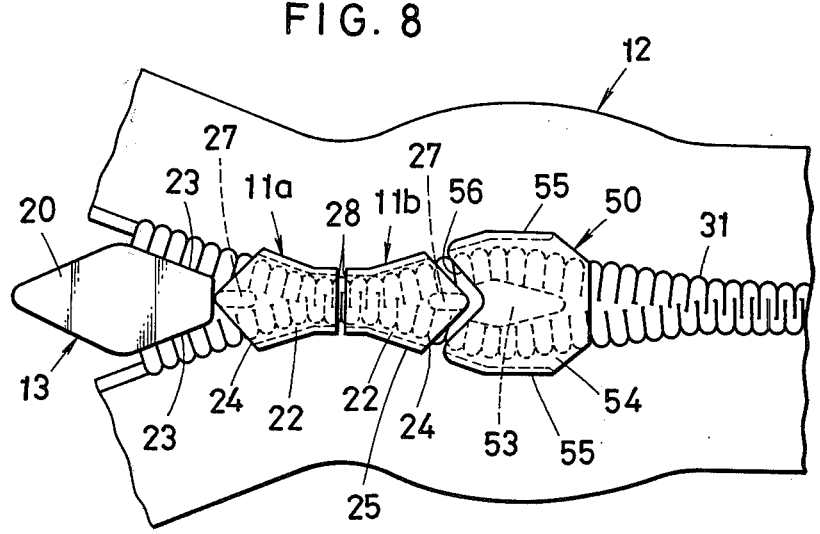
FIG. 8 is a plan view explanatory of the way the fastener chain is assembled through the pair of sliders by use of the apparatus shown in FIG. 6.

When seen in a plan view as in FIG. 8, the guide column 53 is generally elongated in the direction of the aligned longitudinal axes of the sliders 11a and 11b on the slider rest 16a. The guide column 53, moreover, is similar in cross sectional shape to the stringer separator 13 but is smaller and oppositely directed.

The guide plate 54 mounted atop the guide column 53 has a pair of flanges 55 projecting downwardly from its respective side edges. As will be understood from a consideration of FIG. 8, these side flanges 55 are arranged in streamlined extensions from the respective side flanges 25 of the adjacent slider 11b on the slider rest 16a. It will also be noted from FIG. 8 that the side flanges 55 are spaced from the guide column 53 sufficiently to permit the respective rows of fastener elements 31 of the fastener chain 12 to pass longitudinally therebetween. Furthermore, the spacings between the side flanges 55 and the top surface 52 of the support structure 51 must be sufficient to permit the respective rows of fastener elements 31 to pass laterally outwardly therethrough. The guide plate 54, as well as the guide column 53 thereunder, has a V-shaped indentation 56 for receiving at least part of the flared front end 24 of the adjacent slider 11b on the slider rest 16a.

The fastener assembly apparatus of FIG. 6 being constructed as hereinbefore described, the sliders 11a and 11b can be assembled in the following manner with each fastener length of the fastener chain 12 as shown in FIG. 7. The pull tabs 18 of the two sliders may first be inserted into the respective channels formed by the pairs of grooves 17a and 17b in the side walls 15a of the slider holder frame 14a so that the sliders may be mounted on the slider rest 16a with their contracted rear ends 28 opposed to each other. The sliders 11a and 11b are assumed to be immovably locked in position by the unshown slider locking mechanism of this slider holder 10a.

As illustrated in FIG. 9, the slit 29 edges of the fastener chain 12 are then manipulated into the respective spacings between the guide plate 54 and the support structure 51 on both sides of the guide column 53. The pair of stringers of the fastener chain 12 should be succeedingly threaded through the channeled bodies 22 of the sliders 11b and 11a. The fastener elements 31 of the fastener chain 12 are temporarily disengaged by the guide column 53 of the stringer guide 50 and are again interengaged as they succeedingly travel through the channeled slider bodies 22, as illustrated in FIG. 8. By then pulling the fastener chain 12 as indicated by the arrow in FIG. 10, the rows of fastener elements 31 emerge disengaged from the flared front end 24 of the slider 11a.

It will be apparent from the description of the preceding embodiment that the pair of stringers which have passed the slider 11a are separated in a streamlined manner away from each other, as their adjacent longitudinal edges move in sliding contact with the respective stringer separating surfaces 23 of the separator 13.

When the fastener chain 12 is pulled through the sliders 11a and 11b to a required degree, the slider locking mechanism of the slider holder 10a may be caused to unlock both sliders. The trailing side of the fastener chain 12 may then be raised, as indicated by the arrow in FIG. 11, to pull the rows of fastener elements 31 away from under the guide plate 54. The sliders 11a and 11b are now readily withdrawable from the slider rest 16a together with the attached fastener chain 12.

In this second adaptation of the invention, each stringer of the fastener chain 12 travels a meandering path as it is required to pass through two consecutive, oppositely directed sliders arranged between the stringer guide 50 and the stringer separator 13. It will be appreciated, however, that the guide 50 and the separator 13 are so configured and arranged with respect to the two sliders that the paths of travel of the fastener stringers are as streamlined as feasible. The fastener chain 12 can therefore be pulled smoothly through the sliders as there is practically no possibility of the rows of fastener elements 31 being caught by the webs 27, the side flanges 25 or the contracted rear ends 28 of the two sliders or by the flared front end 24 of the slider 11b.

Having thus described the several novel and useful features of the fastener assembly apparatus according to the invention, it is believed that the various objects for which it was designed have been fully accomplished. However, while the invention has been shown and described herein in terms of its specific adaptations, it is to be understood that the invention is not to be restricted by the exact showing of the drawings or the description thereof, as many modifications of the invention may well occur to those skilled in the art without departing from the proper scope or fair meaning of the following claims.

What is claimed is:

1. Apparatus for assembling sliders with fastener stringers, wherein each of the sliders includes a channeled body having a flared front end and a contracted rear end, and a pull tab, said apparatus comprising, in combination, a slider holder for immovably holding a pair of sliders thereon with their contracted rear ends disposed against each other for the assemblage of said fastener stringers therethough, a stringer guide arranged close to said slider holder on one side thereof, said stringer guide being adapted to cause said fastener stringers to be introduced uncoupled into one of said pair of sliders through said flared front end thereof in a streamlined manner, and a stringer separator arranged close to said slider holder on the opposite side thereof, said stringer separator being adapted to cause said fastener stringers to be separated away from each other in a streamlined manner as the same emerge uncoupled out of said flared front end of the other of said pair of sliders.

2. The apparatus as recited in claim 1, wherein said stringer guide comprises a support structure having a top surface, a guide column of substantially diamond-shaped cross section mounted centrally on said top surface of said support structure, and a guide plate mounted atop said guide column and having a pair of side flanges projecting downwardly therefrom, said side flanges being sufficiently spaced from said guide column to permit the respective rows of fastener elements of said fastener stringers to pass longitudinally therebetween.

3. The apparatus as recited in claim 2, wherein said side flanges of said guide plate are sufficiently spaced from said top surface of said support structure to permit the respective rows of fastener elements of said fastener stringers to pass laterally outwardly therebetween.

4. The apparatus as recited in claim 2, wherein said slider holder includes a frame on the top of which said pair of sliders are held immovably, and wherein said top surface of said support structure of said stringer guide is substantially flush with said top of said frame of said slider holder.

5. Apparatus for assembling finished sliders with fastener stringers, wherein each slider includes a slider body and a pull tab, said slider body having a flared front end and a contracted rear end, a top wing, a bottom wing, a web integrally connecting said wings to each other at one end thereof, and side flanges respectively having divergent portions diverging in a direction toward said flared front end and defining together with said web a Y-shaped channel through said slider body, said apparatus comprising, in combination, a slider holder for immovably holding at least one slider in upside-down disposition on a slider rest formed at the top thereof to accommodate assemblage of said fastener stringers and said slider, by passing said fastener stringers in coupled together form into the slider body through said contracted rear end thereof; and a stationary stringer separator positioned in close proximity to said slider holder and on the stringer exit side thereof, said stringer separator including a pair of generally vertical stringer separating surfaces and a top surface, said stringer separating surfaces diverging in a direction away from said slider holder at an angle at which said divergent portions of said side flanges diverge, and terminating short of the projected geometrical intersection of such surfaces said projected intersection being substantially at the position of said web of the slider as held on said slider rest, and said top surface being substantially on a level with the internal surface of said top wing of the slider, whereby said stringer separator causes the fastener stringers to be separated away from each other in a streamlined manner as the stringers emerge uncoupled out of said flared front end of said slider.

6. The apparatus as recited in claim 5, wherein said stringer separator is in the form of a column of pentagonal transverse cross section, whereby said fastener stringers emerging uncoupled out of said flared front end of said slider are separated away from each other at their adjacent longitudinal edges and move in sliding contact with said slider separating surfaces, respectively, of said column.

* * * * *